United States Patent [19]

Weinmann

[11] Patent Number: 4,708,397
[45] Date of Patent: Nov. 24, 1987

[54] MOTOR VEHICLE WHEEL MOUNTING MEANS AND METHOD

[76] Inventor: Paul R. Weinmann, 57 Murray St., Rochester, N.Y. 14606

[21] Appl. No.: 895,693

[22] Filed: Aug. 12, 1986

[51] Int. Cl.[4] .............................................. B60B 3/16
[52] U.S. Cl. .............................. 301/9 DN; 301/111; 301/128
[58] Field of Search .................. 301/9 DN, 5 R, 111, 301/114, 128, 63 R; 411/367, 338, 339, 539, 546

[56] References Cited

U.S. PATENT DOCUMENTS

| | | | |
|---|---|---|---|
| 3,749,450 | 7/1973 | Senter et al. | 301/9 DN X |
| 3,960,047 | 6/1976 | Liffick | 301/9 DN |
| 4,036,530 | 6/1977 | Reppert | 301/9 DN |
| 4,102,036 | 7/1978 | Salter | 411/367 |
| 4,261,621 | 4/1981 | Fox | 301/36 R |
| 4,334,599 | 6/1982 | Ritsema et al. | 411/367 X |

FOREIGN PATENT DOCUMENTS 2080745 2/1982 United Kingdom ............ 301/9 DN

Primary Examiner—Robert B. Reeves
Assistant Examiner—Russell D. Stormer
Attorney, Agent, or Firm—Stonebraker, Shepard & Stephens

[57] ABSTRACT

For mounting relatively thick wheels ("mag" wheels, etc.) on the hubs of motor vehicles, a sleeve is provided, internally threaded to screw onto the mounting stud, and externally formed as a smooth cylinder dimensioned to fit snugly in the stud hole of the wheel, the sleeve being of a length to extend only part way (usually about half way) through the thickness of the wheel. The sleeve is screwed onto the stud tight against the hub. When the wheel is placed on the sleeves (one on each stud, of course), the lug nuts are then placed on the studs and tightened as usual. The sleeves are of such length relative to the lengths of the cylindrical shanks of the nuts that there is a slight gap between sleeve and shank. The sleeve supports that portion of the wheel thickness closest to the hub, and the shank of the nut supports that portion farther from the hub. Flexure forces on the studs are reduced because of the lesser leverage effect, and there is reduced risk of damage to the wheel or the studs under severe driving conditions. Also, mounting of the wheel is facilitated.

7 Claims, 3 Drawing Figures

MOTOR VEHICLE WHEEL MOUNTING MEANS AND METHOD

BACKGROUND OF THE INVENTION

This invention relates to a means and a method for mounting motor vehicle wheels, especially wheels which are relatively thick in the hub region, often called "mag" wheels.

Conventional wheels furnished as original equipment on new passenger automobiles are usually made of pressed steel, having an axial thickness, in the vicinity of the hub, of about ¼ inch. The wheel has a circumferentially spaced series of holes, usually four or five, for receiving threaded studs projecting out from the hub. Nuts, often called lug nuts, are screwed on the threaded studs and engage tightly with the wheel, holding the wheel in place relative to the hub.

Some motorists, especially racing car drivers, prefer not to use the customary original issue wheels, but to use special wheels which are much thicker (in an axial direction), especially in the vicinity of the hub, where the wheel may be 1½ or 2 inches or more in thickness. To hold such wheels in place, extra long studs are used, projecting out (parallel to the axis of rotation) from the hub, to extend through the extra thickness of the wheel. The lug nuts have a cylindrical portion internally threaded to screw onto the stud and externally smooth to fit snugly in the hole extending through the thickness of the wheel, and a hexagonal or other non-circular portion to receive a wrench for tightening or loosening the nut, with a shoulder between the cylindrical or shank portion and the hex portion to bear against the wheel.

However, this usual arrangement for holding mag wheels in place on the hub is not entirely satisfactory. The length of the smooth cylindrical part of the lug nut must not extend all the way through the thickness of the wheel to the hub but must leave a gap between the inner end of the lug nut and the hub, in order that the nut will tighten against the wheel and not tighten against the hub before the wheel is clamped sufficiently tightly. Thus the wheel is unsupported at this critical point, next to the hub, where the gap is required. Moreover, although lug nuts come in different sizes, with cylindrical portions of different lengths, the longer ones are not only more expensive but also less common and harder to find in stock on the shelves of automotive supply stores, so there is a tendency of drivers to use shorter lug nuts, with the result that the gap between the inner end of the nut and the hub is often quite large, say ¾ of an inch or 1 inch or more (with a wheel 2 inches thick), which is a very dangerous condition. With part of the thickness of the wheel unsupported by the studs, especially the part next to the hub, there is substantial risk of cracks and ultimate failure of the wheel in the vicinity of the unsupported area, especially at the high speeds of racing driving. Also, the vehicle weight transmitted to the wheel through the studs is applied at some distance outwardly from the hub, thus having a leverage effect which increases the bending stress to which each stud is subjected.

Moreover, it is hard to install the wheels, especially when attempted by one person alone without a helper. The wheel must be lifted up, have its holes aligned with the studs, then slipped over the studs, and if there is no helper to hold the wheel elevated while one or two nuts are screwed on at least partially, the wheel must be rested on the exposed threads of the studs while one reaches for the nuts and starts to screw them on, then the wheel must be slightly elevated to center the holes in the wheel with respect to the studs, so that the nuts may be screwed further onto the studs. Meanwhile, the temporary resting of the wheel on the studs may have damaged the threads of the studs. All in all, the mounting of the thick or "mag" wheel is quite a ticklish and troublesome job, especially when done by one person alone.

An object of the present invention is the provision of an improved and more satisfactory means and method for mounting thick or "mag" wheels of motor vehicles.

Another object is the provision of a mounting method and means by which a mag wheel may be easily mounted by a single person working without assistance, without danger of damage to the threads of the studs.

A further important object of the invention is the provision of an arrangement which gives full support to the wheel structure at the inner part of its thickness, to promote safety and reduce the risk of breakage, particularly at high speed driving.

A still further object is the provision of an improved mounting arrangement which is relatively inexpensive, and which may be used easily and rapidly.

SUMMARY OF THE INVENTION

According to the invention, these objects are achieved by providing, on each threaded stud, a sleeve which is internally threaded to be screwed onto the stud, and which is externally in the form of a smooth cylinder snugly fitting the bore of the hole through the thickness of the wheel, giving physical support to the wheel. The outer end of the sleeve is slightly tapered or chamfered to assist its entry into the hole in the wheel when the wheel is being installed. The sleeve is screwed all the way onto the stud, tight against the hub. The length of the sleeve is such that there is only a slight gap, say 1/16th or 1/32nd of an inch, between the outer end of the sleeve and the inner end of the adjacent lug nut screwed tightly onto the stud. This gap insures that when the nut is tightened, the nut will tighten against the wheel, to hold the wheel tight against the hub, and such tighnening against the wheel will not be prevented by premature contact with the end of the sleeve.

Further details and explanations will appear in the detailed description which follows.

BRIEF DESCRIPTION OF THE DRAWINGS

In the accompanying drawings, illustrating a preferred example of the invention.

DESCRIPTION OF THE PREFERRED EMBODIMENTS

Figure 1:
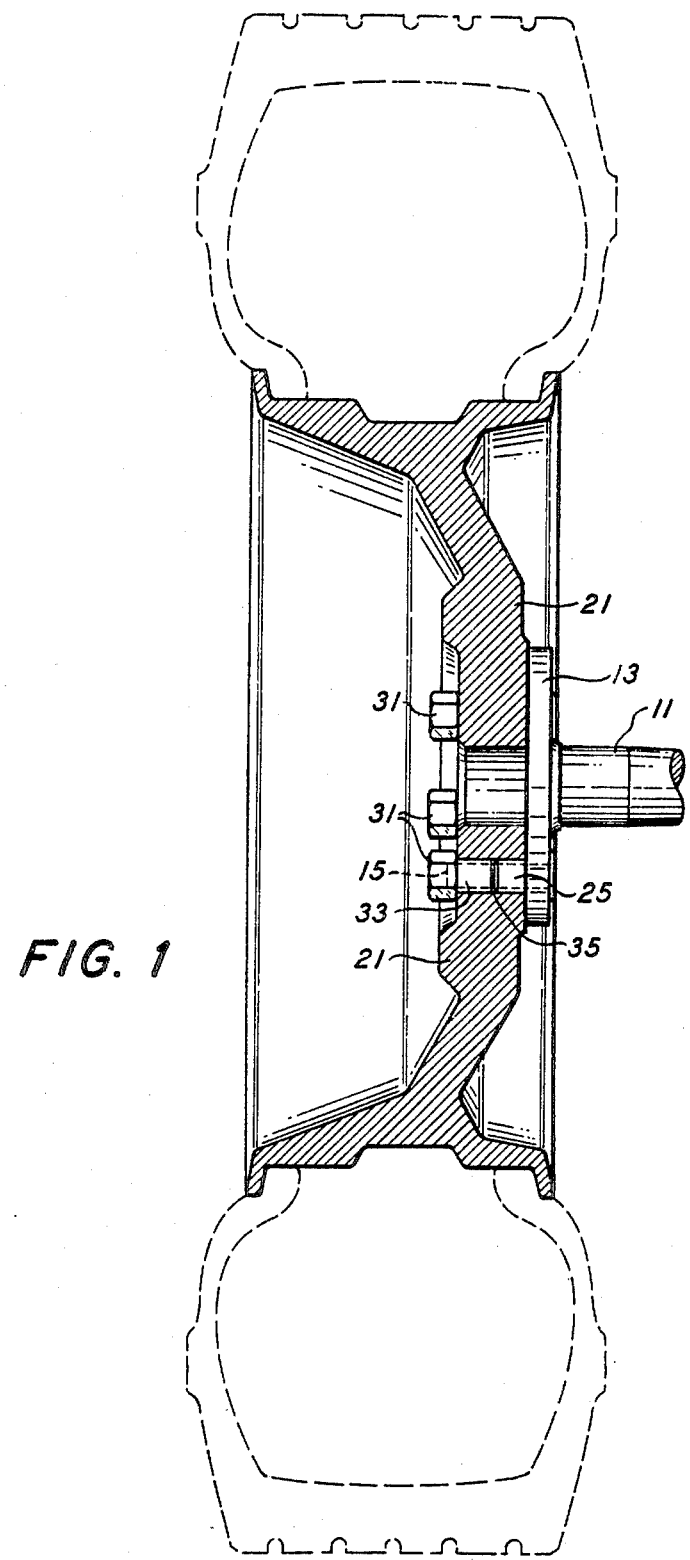
FIG. 1 is a schematic diametrical axial section through a vehicle wheel mounted on a hub by means of the present invention.

Referring now to the drawings, a fragment of a motor vehicle axle is schematically shown at 11, with an attached wheel hub schematically shown at 13. A brake drum is usually present, either attached to or formed integrally with the hub 13, but is not here illustrated since the details of the brake drum are immaterial so far as the present construction is concerned.

Figure 2:
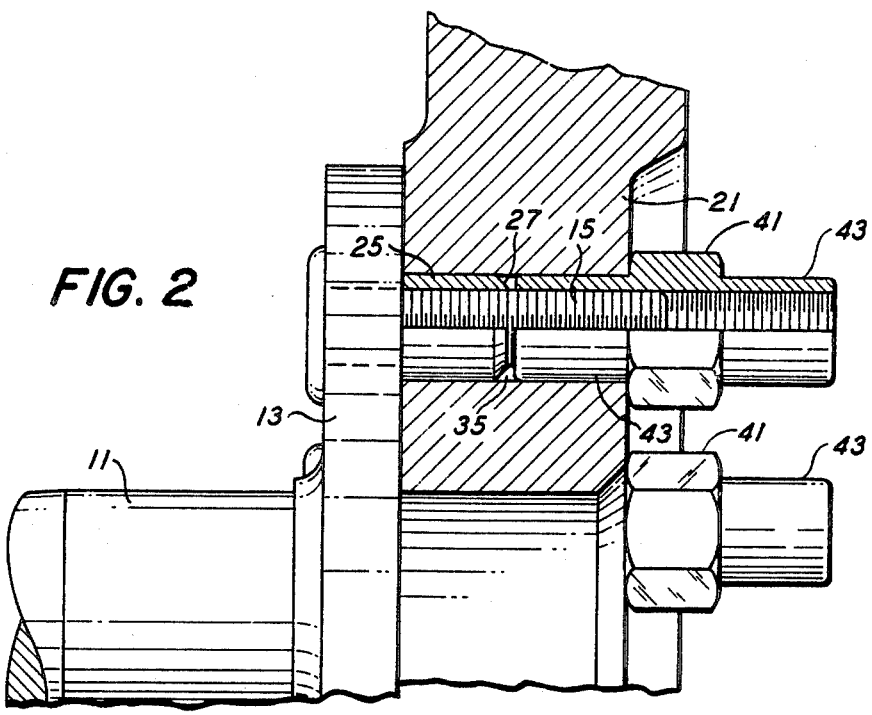
FIG. 2 is a view of a portion of the construction shown in FIG. 1 on a larger scale, to show certain details more clearly, and also illustrating an alternative form of retaining nut or lug nut.

Attached to the hub 13 in the conventional manner are the threaded studs 15, usually four or five in number, five being here shown. The studs extend in a direction parallel to the axis of rotation of the axle, and are equally spaced circumferentially around a circle concentric with the rotary axis. When the wheel to be mounted on the hub is a conventional original-issue wheel as customarily used on passenger automobiles, the studs are rather short because the wheel structure is relatively thin in the vicinity of the hub. But if a special wheel such as the kind called a mag wheel is to be mounted, the studs must be longer, to extend through the thickness of the wheel, which is often 1¾ inches or 2 inches or even more. Such a wheel, with a relatively thick portion 21 in the vicinity of the hub, is shown in FIGS. 1 and 2.

These mag wheels or other thick wheels are held in place by nuts screwed onto the studs and pressing the wheel structure tightly against the hub. In addition, the nuts have smooth cylindrical portions which snugly enter the holes in the wheel, to hold the wheel against movement in radial directions. However, as already mentioned, there must be a gap between the hub and the cylindrical part of the lug nut, to prevent the nut from tightening against the hub, and because of cost and scarcity of long nuts, short nuts are often used, so that in practice the gap is likely to be of serious size, often ¾ of an inch or 1 inch or more.

This means that the stresses and strains caused during driving are concentrated largely on the outer part of the thickness of the hub portion of the wheel, with insufficient support for the inner portion (closest to the hub) of the thickness of the wheel in the hub region. Moreover, the pressure on each stud, in a direction transverse to the stud, caused by the weight of the vehicle carried by the wheel, is concentrated toward the outer end of the stud instead of being distributed throughout the length of the stud. These undesirable conditions increase the risk of breakage or failure of the wheel or the studs or both, particularly under the very severe high stresses and strains imposed by fast driving such as in racing or certain types of competitive driving.

The present invention avoids these undesirable conditions, and also provides other advantages, by using an internally threaded and externally smooth cylindrical sleeve screwed onto each stud tightly against the hub, having an external diameter fitting snugly in the hole in the wheel through which the stud passes, and having a length to reach almost but not quite to the inner end of the nut when the nut is screwed tightly home against the wheel. It is intended that sleeves of this kind be manufactured and sold in various lengths, the user choosing whatever length of sleeve is appropriate to the length of the shank of the lug nut used, so that the outer end of the sleeve, when screwed home, will stop a little short of the inner end of the shank of the lug nut, leaving a slight gap.

The sleeve is shown at 25. The outer end of the sleeve is externally chamfered or slightly tapered, as shown at 27, for ease of mounting the wheel. The inner end of the sleeve is squared off, no chamfer being necessary or desirable at the inner end, since maximum contact with and support of the wheel structure is desired.

The nuts used on the stud may be conventional. They are available on the market in different styles. The nuts shown in FIG. 1 are of one conventional style, having a wrench-receiving hexagonal head 31, and an externally smooth shank portion 33 on one side only of the hex head. This shank portion 33, like the sleeve 25 of the present invention, fits snugly in the hole of the wheel. As mentioned above, the length of the sleeve 25 is such that when the conventional nut 31 is screwed tightly home, there will be a slight gap 35 between the sleeve and the nut. This gap, preferably about 1/16th or 1/32nd of an inch, insures that when the nut is tightened, it will tighten against the wheel to hold the wheel firmly against the hub, and will not tighten against the sleeve and leave the wheel loose. Yet the gap is so small that it does not appreciably interfere with the desired condition of supporting the wheel from each stud substantially continuously throughout the entire thickness of the thick wheel. Even if the gap is wider, such as ⅛ or ¼ of an inch, this is not serious, since the gap occurs approximately midway in the thickness of the wheel, and the important thing is that the wheel structure is rigidly supported at the critical points, the inner surface and the outer surface of the thickness of the wheel.

Figure 3:
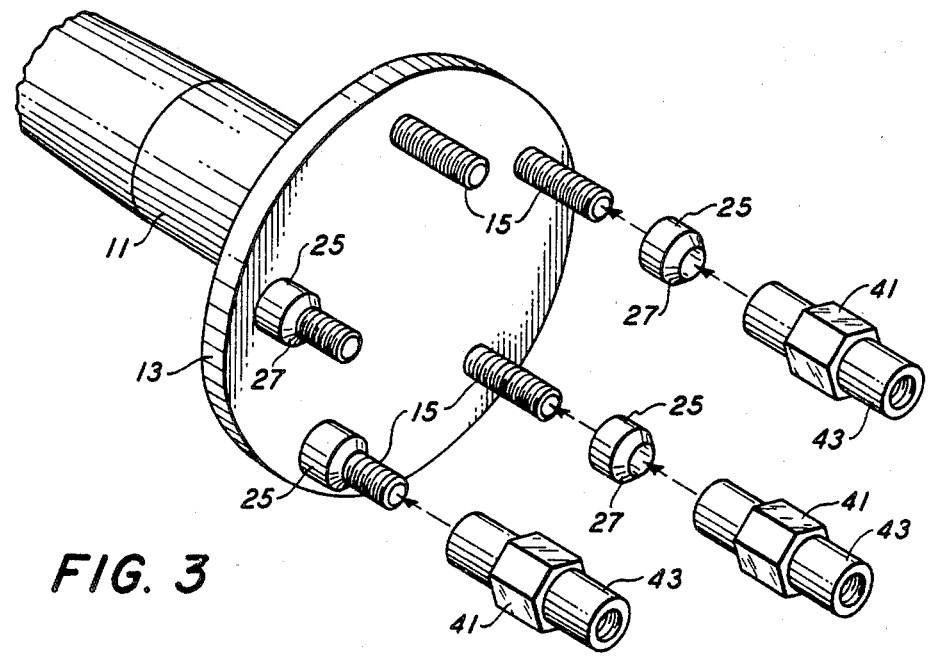
FIG. 3 is an exploded perspective view of a vehicle wheel hub and studs, showing also the mounting sleeves of the present invention and mounting or retaining nuts of the same form shown in FIG. 2.

FIGS. 2 and 3 illustrate a different style of conventional nut commonly used, having a wrench-receiving hexagonal head 41 and two externally smooth cylindrical portions 43 extending in opposite directions from the hex head. Each cylindrical portion or shank of these nuts, like the cylindrical portion of the other style of nut, goes only a fraction of the way through the thickness of a thick wheel, leaving the inner part of the thickness of the wheel unsupported so far as the nut us concerned. According to the present invention, nuts of this style are used in the same way as the nuts of the style first mentioned (FIG. 1); that is, used with the threaded sleeve 25 as shown in FIGS. 2 and 3, the sleeve being of the proper length to leave the above mentioned gap 35 to insure that the nut can be fully tightened against the wheel.

Bearing in mind that both the cylindrical sleeve of the present invention and the cylindrical shank portion of the nut fit snugly within the hole through the wheel, it will be apparent that the weight transmitted from the axle and hub to the wheel is applied to each stud throughout practically the entire thickness of the thick wheel, not just the portion of the stud within the outer portion of such thickness, as would be the case if the sleeve 25 were not used. This greatly reduces the repetetive reverse flexure forces which would otherwise be applied to the studs as the wheel turns under load conditions, and reduces risk of failure under severe working conditions, since a good part of the load is now applied to the stud close to the hub, instead of all of the load being applied at some distance outwardly from the hub.

In addition to improved safety, the sleeve of the present invention has another important advantage, in that it makes the mounting of the wheel on the hub easier, especially when mounting is being done by a single individual without a helper.

When a wheel is to be mounted, the sleeves 25 of the present invention are first placed on all of the studs, and screwed "home" against the hub. Unlike the nuts which are screwed on later (after the wheel is in place), the sleeves are not relied upon to produce any force in an axial direction; therefore they do not have to be screwed on with any great degree of torque force, and the absence of flat spots for receiving a wrench is not a detriment. A frictional grip with ordinary pliers is quite sufficient, and indeed finger gripping may be enough.

Now the wheel is lifted, its stud-receiving holes are aligned with the studs, and the wheel is moved axially so that the sleeves on the studs enter the holes in the wheel. Then the person doing the mounting can let go of the wheel, which will remain in place supported by the sleeves and slightly spaced from the bare threads of the studs, and can pick up the nuts one by one and screw them onto the respective studs. The nuts go on easily, because the sleeves already hold the wheel in the proper location to receive the nuts, with space between the threads of the stud and the wheel structure to receive the shank of the nut. When using the double-shank or double-ended form of lug nut, either shank may be screwed onto the stud, the other one being ineffective.

This mounting procedure is in marked contrast to the awkward procedure of mounting the wheel when the sleeves of this invention are not present. With no sleeves, the wheel must be temporarily rested on and supported by the bare threads of the studs, with consequent danger of damaging the threads, while one reaches for the first one of the nuts. Then the nut can not be screwed onto the stud, because the wheel rests directly on the thread and leaves no room between wheel and thread for the cylindrical portion of the nut to enter, so the wheel must be lifted a fraction of an inch and held in midair, as it were, while the nut is screwed on far enough to support the wheel. The advantage of this invention in convenience of mounting the wheel will be readily apparent to anyone who has struggled with mounting a wheel while unassisted, and this is in addition to the very important matter of increased safety as explained above.

What is claimed is:

1. The combination of a vehicle wheel hub having a plurality of threaded studs projecting therefrom in a direction parallel to a rotary axis of said hub, and a wheel mounted on said hub and having cylindrical holes through which said studs pass, said wheel being relatively thick in the vicinity of said holes, and a lug nut screwed on each of said studs to hold said wheel in place, each of said lug nuts having a cylindrical shank portion fitting snugly in one of said cylindrical holes through only a part of the length of such hole, there being a substantial space between said hub and the inner end of said shank portion, and an internally threaded and externally smooth cylindrical sleeve mounted on each stud with its inner end tight against said hub, said sleeve fitting snugly within a hole in said wheel to support said wheel in the region of the thickness of the wheel close to said hub, in said space between said hub and the inner end of said shank portion of said nut.

2. The invention defined in claim 1, wherein said sleeve is of a length to fill all of said space between said hub and said inner end of said shank, except for a slight gap between said sleeve and said shank sufficient to insure that said lug nut of which said shank is a part may be tightened firmly against said wheel without coming into contact with said sleeve.

3. The invention defined in claim 2, wherein said sleeve is externally chamfered at its end away from said hub, to facilitate mounting a wheel on a hub having a stud on which said sleeve has already been placed.

4. The invention defined in claim 2, wherein the length of said sleeve extends through approximately one-half of the axial thickness of said wheel, and the length of said shank extends through approximately one-half of the axial thickness of said wheel.

5. The method of mounting a wheel which is relatively thick in an axial direction in the vicinity of a stud-receiving hole through the wheel, on a hub having a threaded stud for extending through said hole, which comprises the steps of providing a sleeve internally threaded to screw onto said stud and externally formed as a smooth cylinder dimensioned to fit snugly within said hole, said sleeve being of a length to extend only part way through the length of said hole, screwing said sleeve onto said stud tightly against said hub so as to leave substantially no gap between said sleeve and said hub, placing said wheel against said hub with said sleeve received in said hole so that the portion of the thickness of said wheel nearest to said hub surrounds and is supported by said sleeve, and applying to said stud, outwardly from said sleeve, a lug nut having a shank portion entering snugly into said hole in said wheel to support that portion of the thickness of said wheel which is remote from said hub.

6. The method defined in claim 5, wherein the length of said sleeve and the length of said shank portion of said lug nut are so dimensioned that when said nut is screwd tghtly against said wheel, there is still a gap between said sleeve and said shank.

7. As an article of manufacture, a sleeve for supporting the inner portion of the axial thickness of a relatively thick vehicle wheel mounted on a hub, the wheel having an axially extending cylindrical hole for passage of a threaded stud attached to the hub, said sleeve being internally threaded to screw onto said stud and being externally shaped substantially as a smooth cylinder dimensioned to fit snugly in said cylindrical hole in said wheel and having a length to extend only part way through the axial thickness of said wheel, so that said sleeve may be screwed onto a stud tight against a hub to support an inner portion of the thickness of a wheel while leaving space for a nut to be screwed onto an outer portion of the same stud to support an outer portion of the thickness of the wheel.

* * * * *